Figure 1:
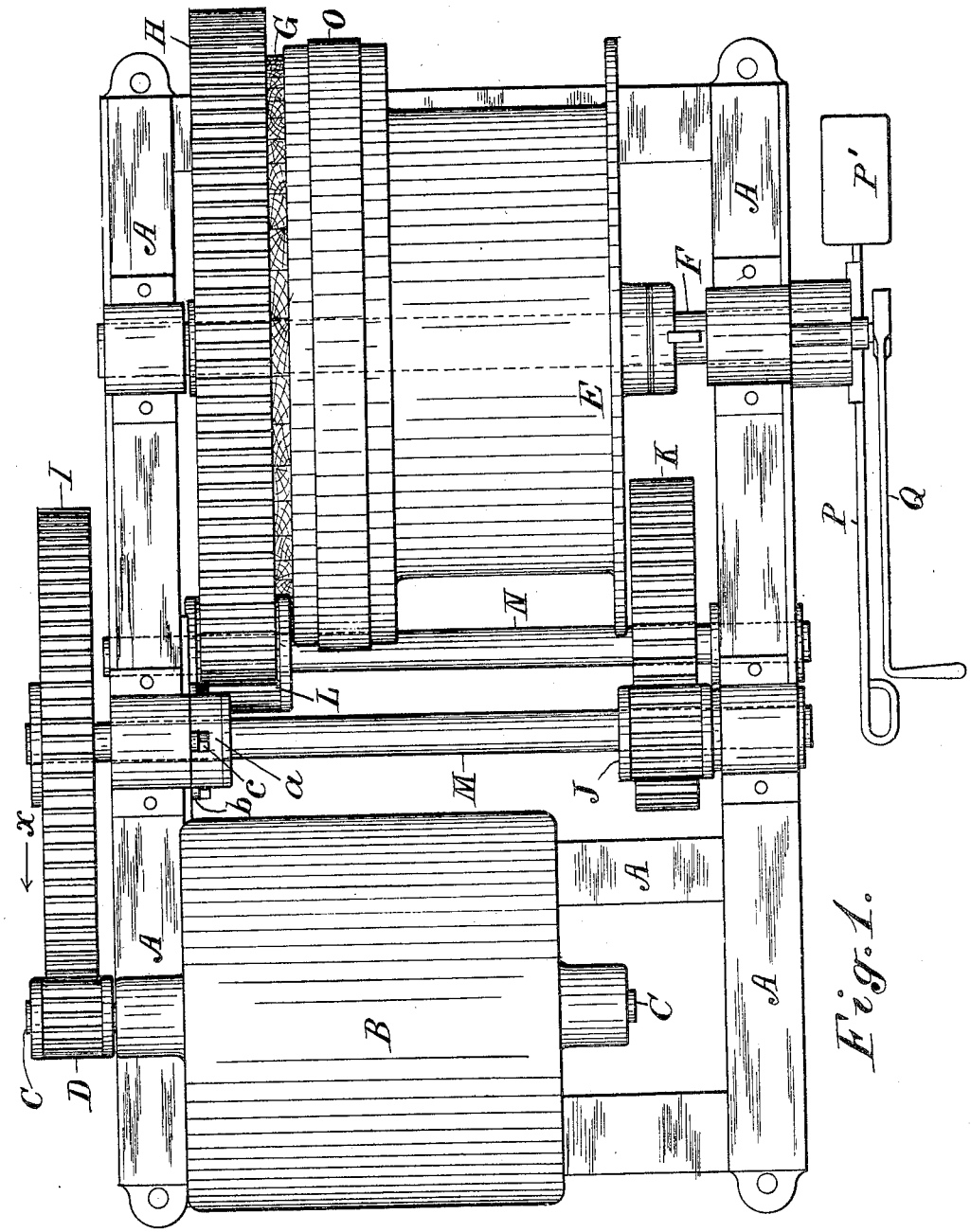

No. 808,763. PATENTED JAN. 2, 1906.
A. LAMBERT.
AUTOMATIC HOLDFAST FOR ELECTRIC HOISTER DRUMS.
APPLICATION FILED APR. 13, 1905.

4 SHEETS—SHEET 1.

Attest:
L. Lee.
Arthur F. Kraton

Inventor.
Asher Lambert, per
Thomas S. Crane, Atty.

No. 808,763. PATENTED JAN. 2, 1906.
A. LAMBERT.
AUTOMATIC HOLDFAST FOR ELECTRIC HOISTER DRUMS.
APPLICATION FILED APR. 13, 1905.

4 SHEETS—SHEET 2.

Attest:
L. Lee.
Arthur F. Heaton.

Inventor.
Asher Lambert, per
Thomas S. Crane, Atty.

No. 808,763. PATENTED JAN. 2, 1906.
A. LAMBERT.
AUTOMATIC HOLDFAST FOR ELECTRIC HOISTER DRUMS.
APPLICATION FILED APR. 13, 1905.
4 SHEETS—SHEET 3.
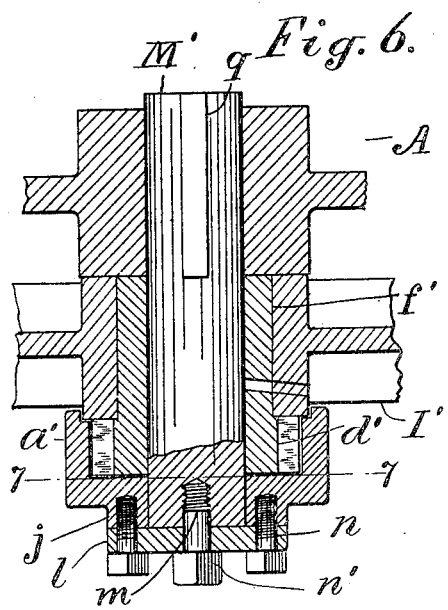
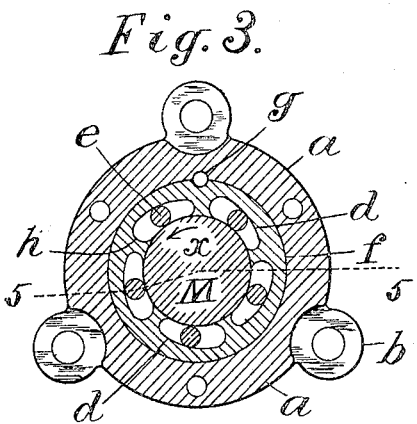
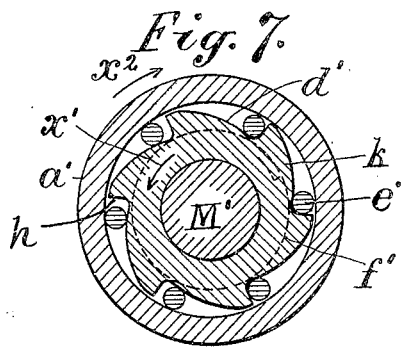
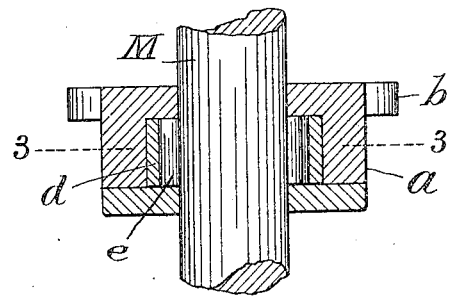
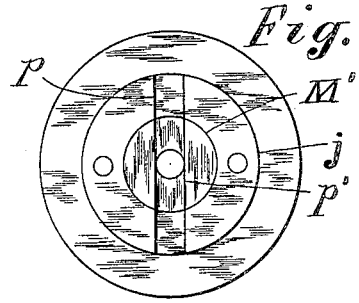
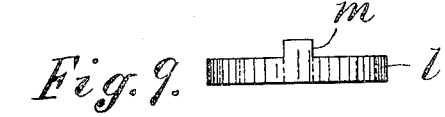
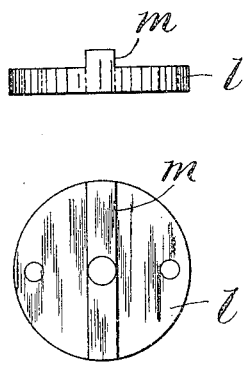
Attest:
L. Lee.
Arthur F. Heaton.
Inventor.
Asher Lambert, per
Thomas S. Crane, Atty.

UNITED STATES PATENT OFFICE.

ASHER LAMBERT, OF NEWARK, NEW JERSEY.

AUTOMATIC HOLDFAST FOR ELECTRIC-HOISTER DRUMS.

No. 808,763.　　　　Specification of Letters Patent.　　　　Patented Jan. 2, 1906.

Application filed April 13, 1905. Serial No. 255,369.

*To all whom it may concern:*

Be it known that I, ASHER LAMBERT, a citizen of the United States, residing at 1 Johnson avenue, Newark, county of Essex, and State of New Jersey, have invented certain new and useful Improvements in Automatic Holdfasts for Electric-Hoister Drums, fully described and represented in the following specification and the accompanying drawings, forming a part of the same.

In electric hoisters the hoisting-drum is always connected with the spindle of the motor-armature by reduction-gearing, so as to rotate the hoisting-drum at a much slower speed than the motor, and it is readily understood that, although the motor has power to elevate the load, it has no power when the electric current is cut off to sustain the load in its elevated position, as the armature is not then controlled by the electric current.

The object of the present invention is to furnish in the train of gearing an automatic device which will operate to hold the load fast in its elevated position when the motor is stopped, the lowering of the load being effected or controlled independently by the usual friction-clutch connecting the hoisting-drum with the train of gearing and the brake-strap applied to such drum.

The holdfast is constructed with eccentric and concentric seats formed upon parts of the gearing which are arranged to revolve in relation to one another with locking-rolls between such seats, and the mechanism of the holdfast may be applied to one of the driving-shafts, as the shaft M in Figures 1, 2, 3, and 4, or to the hub of one of the driving-wheels, as in Figs. 5, 6, 7, and 8. When the holdfast is applied to the shaft, the locking-rolls can be made to bear directly upon the shaft, and in such case a shaft is preferably selected which is geared backwardly from the hoisting-drum, so as to diminish the torsional strain upon such shaft. Only the construction is claimed herein by which the holdfast is applied to the shaft and hub of one of the intermediate gears.

In the annexed drawings, Figs. 1, 2, 3, and 4 show a casing containing the eccentric seats fixed rigidly upon the frame and the locking-rolls of the "holdfast" device operating directly upon the shaft of one of the intermediate gears. The remaining figures show a casing with a concentric seat fixed rigidly upon the end of a stationary shaft and extended over the hub of one of the intermediate gear-wheels, which is arranged to rotate upon such shaft and is provided with the eccentric seats to be affected by the locking-rolls.

Figure 2:
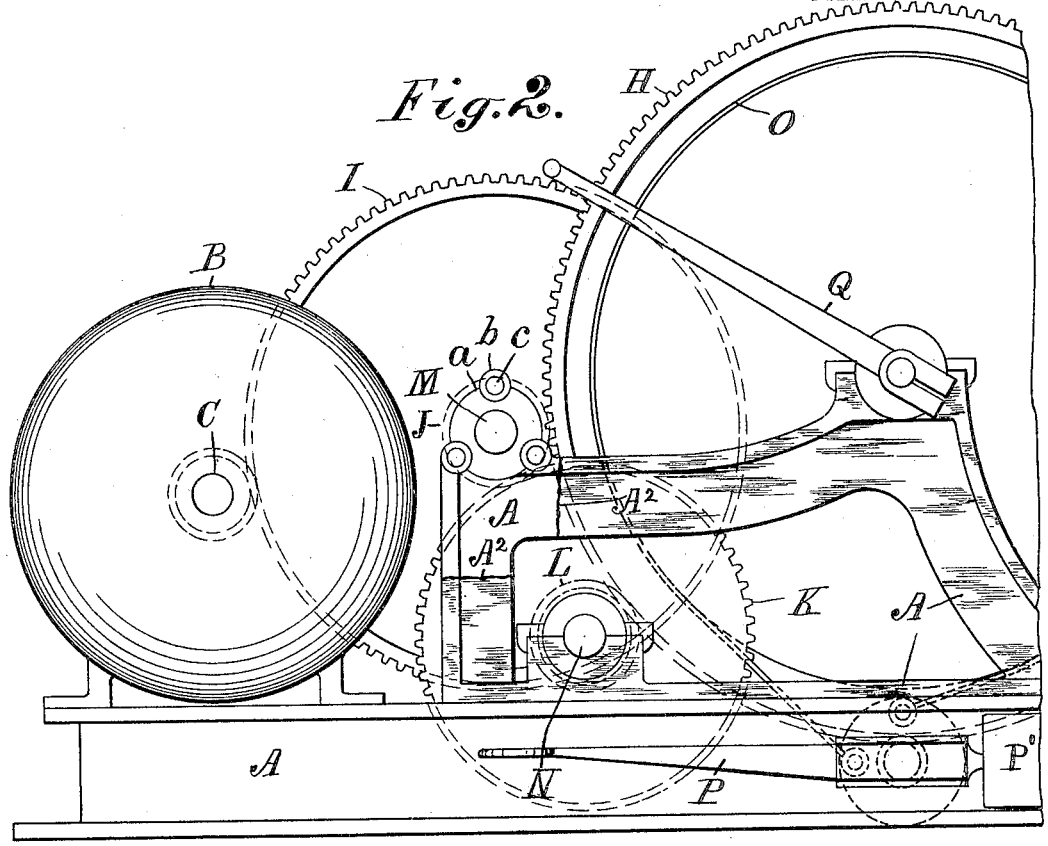
Figure 5:
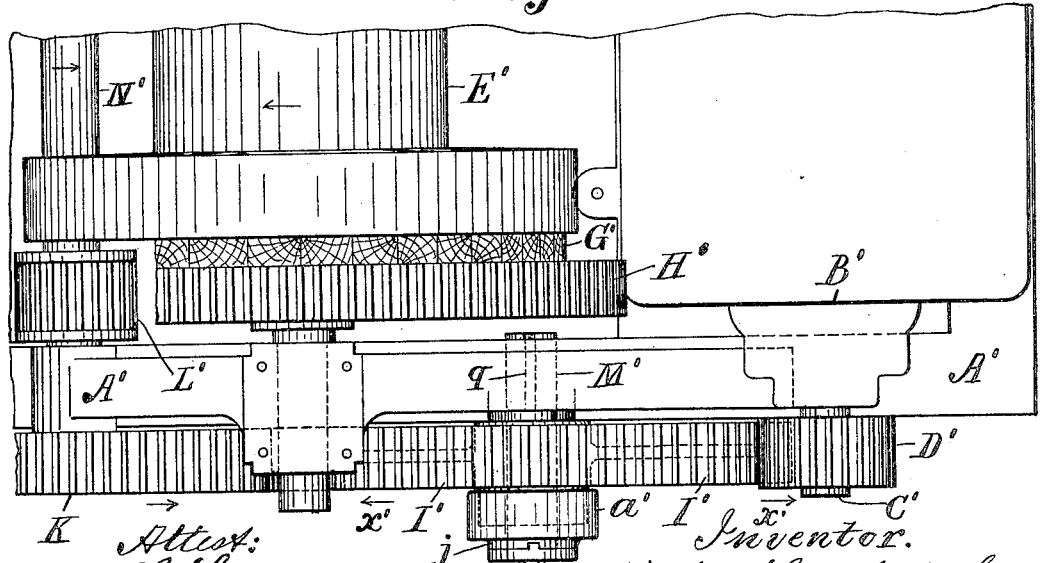
Figure 11:
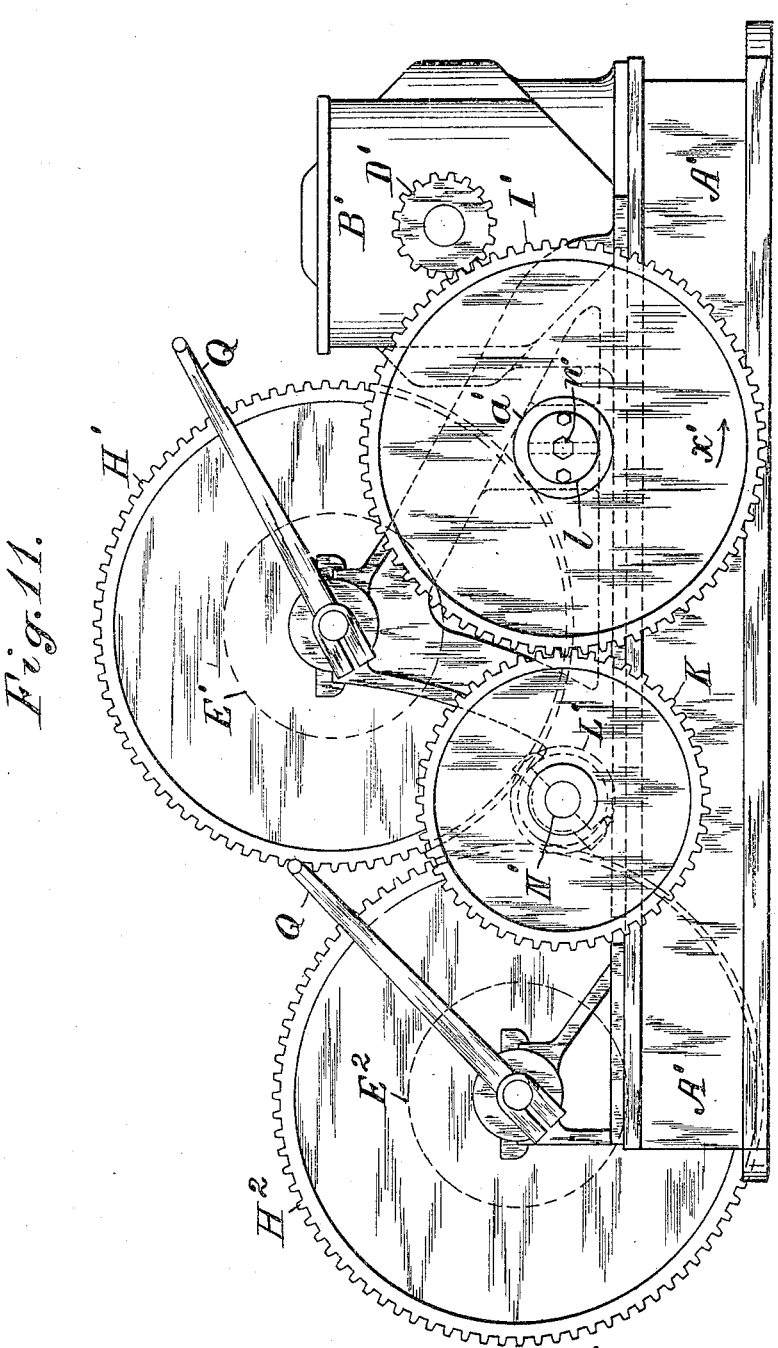

In the drawings, Fig. 1 is a plan of an electric hoister with the holdfast applied to a revolving shaft. Fig. 2 is an elevation of the same with the right-hand side of the hoister broken off for want of room. Fig. 3 is a section (on line 3 3 in Fig. 4) of the holdfast shown in Fig. 1. Fig. 4 is a section on line 5 5 in Fig. 3. Fig. 5 shows one corner of a hoister in plan with a holdfast applied to a wheel revolving upon a stationary shaft. Fig. 6 is a horizontal section, where hatched, at the center of the holdfast shown in Fig. 3. Fig. 7 is a section on line 7 7 in Fig. 6. Fig. 8 is a front view of the holdfast shown in Fig. 6. Fig. 9 is an edge view, and Fig. 10 a front view, of the cap for the same holdfast. Fig. 11 is an elevation of the hoister shown in Fig. 5.

In Figs. 1 to 4, inclusive, A designates the hoister-bed; B, an electric motor mounted upon the same, with its armature-spindle C provided upon the end with toothed pinion D. The drum E is shown mounted upon a shaft F and driven by a friction-clutch G, attached to a gear-wheel H. The pinion D is connected with the gear-wheel H by intermediate gear-wheels I, J, K, and L, which are mounted upon two shafts M and N. Fig. 1 shows the casing *a* of the holdfast bolted to the frame A by lugs *b* and bolts *c* and operating upon the revolving shaft M of the gears I and J. A brake-strap O is shown upon one end of the hoisting-drum E and is controlled in the usual manner by a foot-lever P, and the friction-clutch G is shown with the usual hand-lever Q for controlling its action. When the lever Q is raised, the drum E turns loosely upon its shaft F to lower the load, and the speed of the drum is then under the control of the brake O P. The brake is held normally from operation by a weight P′ upon the foot-lever P, and the friction-clutch is normally engaged with the drum, so that the operation of the train of gear-wheels D I J K L H serve when the motor is actuated to rotate the drum and hoist the load. The shaft M and gear-wheel I then revolve, as indicated by the arrow *x* in Figs. 1 and 3. The casing *a* is shown in Fig. 3 with a series of eccentric seats *d* adjacent to the surface of the shaft M, with rolls *e* inserted between the same, as a stud, to carry a loose intermediate gear-wheel I', which meshes with the toothed pinion D' upon the spindle C' of the motor B'. No elevation of this gearing is shown, as it is of a class well known in which the hoisting-drum is set close to the motor. In Fig. 5 only one end of the drum E' is shown, with the friction-clutch G' and a gear H' and pinion L', driven by shaft N', and gear K', which meshes directly with the intermediate wheel I'. The shaft M' is held securely from turning in the frame A' by a key $q$, and a casing $a'$ is secured upon the outer end of the shaft by a boss $j$ and formed with a concentric seat projected toward the gear-wheel I' to embrace a hub upon the gear-wheel having eccentric seats $d'$ formed thereon. For convenience of manufacture the portion of the hub which carries the seats shown in Figs. 6 and 7 is formed as a bushing $f'$, locked within the gear-wheel by a key $k$ and enlarged upon the outer end to form six eccentric seats $d'$. The rolls $e'$ are shown in their inoperative position in Fig. 7, as would be the case when the intermediate gear-wheel is revolving around the stationary shaft during the operation of the motor, as indicated by the arrows $x'$ in Figs. 5, 7, and 11. When turned in the opposite direction, the rolls are jammed hoisting-drum and gearing connecting the electric motor with the drum by a friction-clutch, with one of the intermediate gears revolved upon a stationary shaft, the shaft and hub of the gear having one of them, longitudinally-grooved eccentric seats, and the other having a contiguous cylindrical seat with rolls fitted between the said seats, as and for the purpose set forth.

2. In an electric hoister having the motor connected with the drum by gearing, the combination, with one of the intermediate gear-wheels, of the fixed shaft M' supporting the same, the casing attached rigidly to the shaft and extended over the hub of the gear-wheel, one of the said parts having longitudinally-grooved eccentric seats, and the other having a contiguous cylindrical seat with rolls fitted between the said seats, as and for the purpose set forth.

3. In an electric hoister having the motor connected with the drum by gearing, the combination, with the hoister-frame having the stationary shaft M', of one of the intermediate gear-wheels mounted to turn thereon, the casing $a'$ attached rigidly to the shaft and extended over the hub of the gear-wheel, the bushing $f'$ fitted within the gear-wheel hub to ride upon the shaft and carrying the eccentric seats $d'$ extended within the casing, and the rolls $e'$ fitted between the seats and the casing, as and for the purpose set forth.

4. In an electric hoister having the motor connected with the drum by gearing, the combination, with the hoister-frame having the stationary shaft $M'$, of one of the intermediate gear-wheels mounted to turn thereon, the casing $a'$ extended over the hub of the gear-wheel and having a boss fitted to the end of the shaft, the boss and shaft being grooved transversely, the cap $l$ having the tongue $m$ fitted to said groove and attached to the casing to hold the same from turning, and the rolls $e'$ fitted between the seats and the casing, as and for the purpose set forth.

5. In an electric hoister, the combination, with an electric motor, of two hoisting-drums $E'$ and $E^2$ provided respectively with the gear-wheels $H'$ and $H^2$, the pinion $L'$ meshing with both of the said gear-wheels, and an intermediate gear connecting the said pinion with the electric motor and a holdfast applied to the hub of the intermediate gear, whereby such holdfast arrests both of the said drums when the electric motor is stopped.

In testimony whereof I have hereunto set my hand in the presence of two subscribing witnesses.

ASHER LAMBERT.

Witnesses:
T. M. WATSON, Jr.,
THOMAS S. CRANE.